United States Patent Office 3,067,208
Patented Dec. 4, 1962

3,067,208
1,3-DIHYDRO-2,3,5-BENZOTHIA-DIAZEPINE-
2,2-DIOXIDES
Uberto Teotino and Giorgio Cignarella, Milan, Italy,
assignors to Lepetit, S.p.A., Milan, Italy
No Drawing. Filed Nov. 17, 1959, Ser. No. 853,444
Claims priority, application Great Britain Dec. 3, 1958
3 Claims. (Cl. 260—327)

This invention relates to new pharmacologically active compounds and a process for preparing the same. More particularly, the compounds with which the invention is concerned are 1,3-dihydro-2,3,5-benzothiadiazepine 2,2-dioxides of the formula

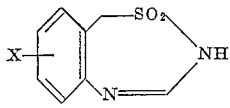

wherein X represents hydrogen or halogen.

The compounds of the above generic formula are very effective as diuretics. They can be administered in doses ranging between 100 and 500 mg., and owing to the low toxicity of the substances these doses may be repeated 3–4 times daily for several days.

The process for preparing the new 1,3-dihydro-2,3,5-benzothiadiazepine 2,2-dioxides starts from 2-aminobenzylsulfonamides of the formula

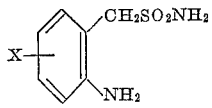

wherein X is as above defined, which, when heated for 2–10 hours at a temperature of 100–130° C. with ethyl orthoformate in an inert organic solvent boiling higher than the selected reaction temperature, such as propylene glycol, toluene, xylene and others, while continuously distilling off the ethyl alcohol formed in the reaction, give the end compound of the invention. These are then isolated by conventional methods.

The starting 2-aminobenzylsulfonamides, which are new compounds, are in turn prepared by reacting a 2-nitrobenzyl chloride with thiourea, dissolving the obtained 2-nitrobenzylsulfonyl chloride in an inert anhydrous organic solvent, adding ammonia to the solution and collecting the precipitated 2-nitrobenzylsulfonamide. This is then hydrogenated at room temperature and atmospheric pressure using a palladium on charcoal catalyst. The obtained 2-aminobenzylsulfonamide is then converted, if desired, into the ring halogenated compounds by conventional procedures.

The following examples are illustrative of the processes for preparing both the starting 2-aminobenzylsulfonamides and the final 1,3-dihydro-2,3,5-benzothiadiazepine 2,2-dioxides.

EXAMPLE 1

1,3-Dihydro-2,3,5-Benzothiadiazepine 2,2-Dioxide

Into a solution of 20 g. of o-nitrobenzylsulfonyl chloride in 300 ml. of anhydrous ethyl ether, previously cooled below 5°, a steam of gaseous ammonia was bubbled until a sample of the ether solution failed to give a precipitate by further ammonia addition. The abundant white precipitate was collected by suction and recrystallized from 250 ml. of water. Yield 14.5 g. (80%) of 2-nitrobenzylsulfonamide, white needles, M.P. 139–140°.

A solution of 6.5 g. of o-nitrobenzylsulfonamide in 150 ml. of anhydrous ethanol was hydrogenated at room temperature and under atmospheric pressure in the presence of 1.5 g. of 10% palladium on charcoal. The reduction was complete after about 45–50 minutes. The catalyst was filtered off and the solution evaporated to dryness in vacuo; the residual oil (5.1 g.) became solid after standing for some minutes and showed M.P. 89–90°. Recrystallisation from 20 ml. of isopropanol gave 4.2 g. (75%) of pure 2-aminobenzylsulfonamide.

A mixture of 3.7 g. of 2-aminobenzylsulfonamide and 10 ml. of propylene glycol was slightly warmed until solution occurred, then 13 ml. of ethyl orthoformate were added. The mixture was heated for 6 hours on an oil bath maintained at a temperature of 120°. The ethanol formed in the reaction distilled off while a solid amorphous product gradually formed in the solution. On cooling to room temperature 1,3-dihydro-2,3,5-benzothiadiazepine 2,2-dioxide precipitated in the form of crystals. The solids were collected by suction and recrystallised from 100 ml. hot methanol. Yield 2.7 g. (68.5%), M.P. 234–235°.

EXAMPLE 2

1,3-Dihydro-8-Bromo-2,3,5-Benzothiadiazepine 2,2-Dioxide 5.4 g. of 2-aminobenzylsulfonamide were dissolved in 84 ml. of glacial acetic acid. To this solution 1.09 ml. of bromine in 80 ml. of acetic acid were slowly added under stirring: the temperature raised to 30–35° and a white crystalline product separated. After the addition was complete, the reaction mixture was stirred for an additional 15 minutes, then filtered and the precipitate washed with ethyl ether. This precipitate was heated with 25 ml. of 10% sodium hydroxide for two hours on a boiling water bath: on cooling and neutralising with hydrochloric acid 2-amino-5-bromobenzylsulfonamide precipitated: yield 4.6 g., M.P. 156–57°.

1,3 - dihydro-8-bromo-2,3,5-benzothiadiazepine 2,2-dioxide was prepared in 47% yield according to the process described for 1,3-dihydro-2,3,5-benzothiadiazepine 2,2-dioxide using toluene as the solvent and heating at 110° C. for 5 hours. M.P. 260° (dec.).

We claim:
1. A compound of the formula

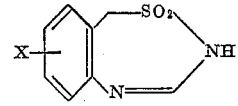

wherein X is a member of the class consisting of hydrogen and bromine.
2. 1,3-dihydro-2,3,5-benzothiadiazepine 2,2-dioxide.
3. 1,3 - dihydro-8-bromo-2,3,5-benzothiadiazepine 2,2-dioxide.

References Cited in the file of this patent

UNITED STATES PATENTS 2,910,473    Novello _____ Oct. 27, 1959

OTHER REFERENCES

Parke et al.: Jour. Chem. Soc. (London), 1950, pp. 1760–63.
Richter: Organic Chemistry Vol. 4, pp. 4–8 (1947).